(12) United States Patent
Peshansky et al.

(10) Patent No.: US 8,196,121 B2
(45) Date of Patent: Jun. 5, 2012

(54) MODULAR INTEGRATION OF DISTINCT TYPE SYSTEMS FOR THE COMPILATION OF PROGRAMS

(75) Inventors: Igor Peshansky, Emerson, NY (US); Mukund Raghavachari, Baldwin Place, NY (US)

(73) Assignee: International Business Machines Corporation, Armonk, NY (US)

( * ) Notice: Subject to any disclaimer, the term of this patent is extended or adjusted under 35 U.S.C. 154(b) by 1291 days.

(21) Appl. No.: 11/844,315

(22) Filed: Aug. 23, 2007

(65) Prior Publication Data

US 2009/0055800 A1 Feb. 26, 2009

(51) Int. Cl.
*G06F 9/45* (2006.01)

(52) U.S. Cl. ...................................................... 717/140

(58) Field of Classification Search ........... 717/140–161
See application file for complete search history.

(56) References Cited

U.S. PATENT DOCUMENTS

| | | | | |
|---|---|---|---|---|
| 8,032,859 B2* | 10/2011 | Meijer et al. | | 717/106 |
| 2004/0015902 A1* | 1/2004 | Kosche et al. | | 717/141 |
| 2004/0205342 A1* | 10/2004 | Roegner | | 713/168 |
| 2006/0212847 A1* | 9/2006 | Tarditi et al. | | 717/117 |
| 2006/0242628 A1* | 10/2006 | Plesko et al. | | 717/131 |
| 2007/0050168 A1* | 3/2007 | Meijer et al. | | 702/119 |
| 2007/0234288 A1* | 10/2007 | Lindsey et al. | | 717/117 |
| 2007/0256060 A1* | 11/2007 | Ryu et al. | | 717/140 |
| 2008/0120283 A1* | 5/2008 | Liu et al. | | 707/4 |
| 2008/0313609 A1* | 12/2008 | Meijer et al. | | 717/114 |

OTHER PUBLICATIONS

Harren et al., "XJ: Facilitating XML Processing in Java™," May 2005, ACM.*
Bordawekar et al., "Simplify XML processing with XJ," Jun. 2005, IBM, p. 1-6.*

* cited by examiner

*Primary Examiner* — Wei Zhen
*Assistant Examiner* — Qing Chen
(74) *Attorney, Agent, or Firm* — Michael J. Buchenhomer; Vazken Alexanian

(57) ABSTRACT

A method for extending functionality of a compiler includes: receiving a first source file written in a language that supports multiple system types, wherein the first source file includes a plurality of source constructs associated with parameter types of the multiple type systems; annotating each of the plurality of source constructs with the type system from one of the multiple type systems and precise parameter type to which its associated type system belongs; retrieving type system rules corresponding to each type system referred to in the first source file from a type system loader; verifying, using the type system rules, that instances of use of variables, expressions, and methods in the first source file are appropriate with respect to the type system of annotated types associated with the source constructs; and compiling the first source file to produce a second source file including type information retained from the first source file.

16 Claims, 3 Drawing Sheets

MODULAR INTEGRATION OF DISTINCT TYPE SYSTEMS FOR THE COMPILATION OF PROGRAMS

CROSS-REFERENCE TO RELATED APPLICATIONS

Not applicable.

STATEMENT REGARDING FEDERALLY SPONSORED-RESEARCH OR DEVELOPMENT

Not applicable.

INCORPORATION BY REFERENCE OF MATERIAL SUBMITTED ON A COMPACT DISC

Not Applicable.

FIELD OF THE INVENTION

The invention disclosed broadly relates to the field of information processing systems and more particularly relates to compilation and execution of programs written in a language that permits the use of multiple type systems.

BACKGROUND OF THE INVENTION

Domain-specific languages simplify programming by allowing programmers to develop applications in terms of abstractions relevant to particular domains. It is often advantageous to construct domain-specific languages as extensions to a base language, such as Java, C, and others. By doing so, programmers can reuse knowledge of the base language as well as existing code artifacts, such as libraries, for those languages. For the portions of the program that pertain to the domain, they can use the language extensions for that particular domain.

For example, the XJ language was developed by IBM for the integration of XML as a first-class construct into Java. XJ conforms to XML standards (XML Schema, Namespaces, XPath, XML 1.0) and is a strict extension of Java 1.4. By integrating XML constructs into the language, programmers can develop efficient, robust XML processing applications more intuitively than can be done using Java alone. While programmers can use XML-based constructs (such as XPath expressions) in developing an application, the compiler converts these constructs into standard Java byte codes that can execute on any Java Virtual Machine (JVM). Thus, a programmer has the advantage of the abstractions provided by XJ at the source level, while retaining the portability of Java at the execution level.

The XJ language allows programmers to distinguish XML data from non-XML data through type annotations on variables, methods, and expressions. The compiler recognizes the XML type system: it ensures that accesses to XML data and expressions are correct with respect to the XML Schema rules that govern the use of data annotated as being XML. To guarantee execution of XJ programs on standard virtual machines, however, the compiler generates pure Java byte code when compiling an XJ source file; thus, the generated code contains no XML type annotations. When, subsequently, one wishes to compile another XJ source file that refers to XML types used in the object code version of an XJ source file, an ordinary compiler would not have sufficient information to verify that the accesses in the XJ source file are correct with respect to the XML type system: the object code version has lost the necessary XML type annotations. Currently there is no straightforward way to record in compiled object code, the connection between the logical types (XML) and the concrete types (i.e., Java objects) so that a compiler may retain this information when another class is compiled against this object code. Supporting the separate compilation of XJ source files is an important issue since one would often wish to compile source files when they refer to types or methods used in code for which the source is not longer available (for example, library routines).

If one wants to extend the XJ compiler with mechanisms to handle other type systems, for example, to support types based on the schemas in relational databases, in current compilers, one would have to modify the compiler by hand. In general, consider a generic domain-specific language compilation framework, where a source file may refer to data governed by five different type systems: a Java system, and T2, T3, T4, T5 systems. The developer has a source file with different data types and specifies that data type A should satisfy the Java system rules, data type B should satisfy the T2 system rules, and so forth. What is desired is a general framework for developing compilers for such languages, such that a program can be checked with respect to the rules of the appropriate type systems.

Furthermore, when the compiler generates object code from the source programs, one would like to ensure that the appropriate type information is not lost. In some sense, the object code is also a domain-specific language, with its own set of types—it would be beneficial to extend it with auxiliary type systems using the same mechanisms as used for source programs.

There is a need for a method to retain type information of data belonging to different type systems in order to overcome the shortcomings of the prior art.

SUMMARY OF THE INVENTION

Briefly, according to an embodiment of the invention, a method includes steps or acts of: receiving a first source file written in a language that supports multiple type systems, wherein the first source file includes a plurality of source constructs associated with parameter types of the multiple type systems; annotating each of the plurality of source constructs with the type system from one of the multiple type systems and precise parameter type to which its associated type system belongs; retrieving type system rules corresponding to each type system referred to in the first source file from a type system loader; verifying, using the type system rules, that instances of use of variables, expressions, and methods in the first source file are appropriate with respect to the type system of annotated types associated with the source constructs; and compiling the first source file to produce a second source file including type information retained from the first source file.

According to another embodiment of the present invention, an information processing system configured to carry out the method as described above includes the following: a first source file written in a language that supports multiple file systems, wherein the first source file includes a plurality of source constructs associated with parameter types of multiple type systems; an input/output interface for receiving the first source file; a compiler operatively coupled with the input/output interface, the compiler configured for: annotating each of the plurality of source constructs with the type system and precise parameter type to which its associated type belongs; retrieving type system rules corresponding to each type system referred to in the first source file; verifying, using the type system rules, that instances of use of variables, expressions, and methods in the first source file are appropriate with respect to the type system of annotated types associated with the source constructs; and compiling the first source file to produce a second source file that retains the type information from the first source file.

The method can also be implemented as machine executable instructions executed by a programmable information processing system or as hard coded logic in a specialized computing apparatus.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
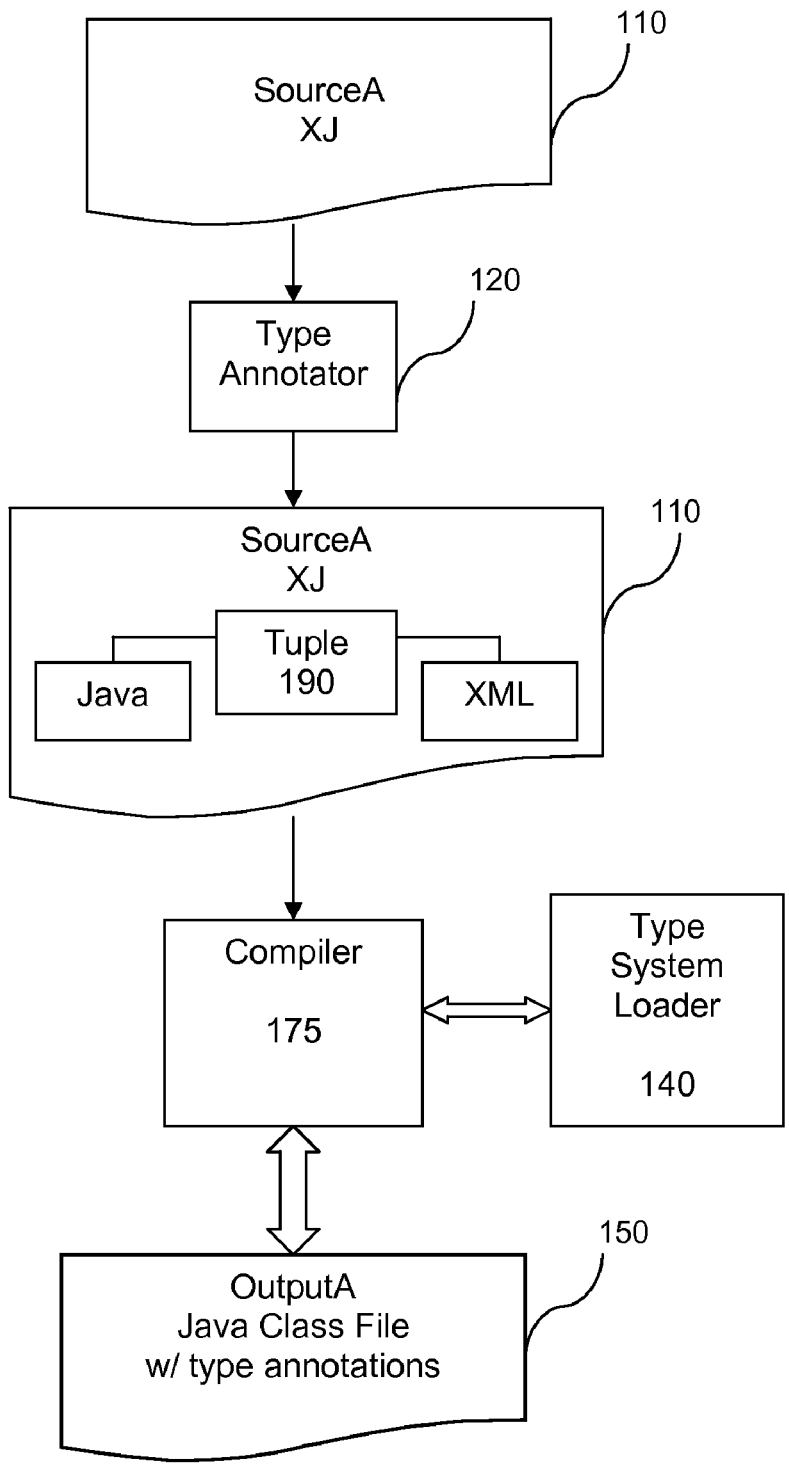
FIG. 1 is a flowchart of a method according to an embodiment of the invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a method for checking, during the compilation of a program, the type information for variables, methods, and expressions in the program with respect to multiple type systems. This method is generic so that the compilation portion of the framework need not be rewritten for each new domain-specific language, but can be reused across several domain-specific languages. This framework is of necessity extensible to any new type system since the set of type systems that the framework must handle is not known in advance.

The program is first passed through a type annotator that marks each source construct in the program with the type system and precise type within the type system. Program languages have specific rules for handling data types. During the annotation process, other source files may need to be processed—for each of them the type annotator appropriate for that source file is loaded by the compiler and used to annotate it iteratively.

Once the source file is annotated appropriately, the rules for the type systems referred to by the source file are used to verify that the program is written correctly. After the program is verified, the compiler generates object code. The object code is treated as a domain specific language in that its type annotator has sufficient information to recover the type systems and precise type associated with constructs in the object code. A type system is really just a set of rules for handling the data types for its particular program language.

Though a method according to the present invention is applicable to any programming language with multiple type systems, we use the programming language XJ as the focus of our examples. XJ augments the standard Java type system with an XML Schema-based type system.

A type system defines semantic rules for programs. Programmers may annotate variables, methods or expressions in a source program with types, or the types associated with these code artifacts may be inferred automatically. The type system ensures that variables (methods, expressions) annotated with a type are used according to the rules of that type. For example, one such rule might be that one cannot assign a "string" value into a variable of type "integer."

In XJ, one can declare that a variable should conform to a specified XML Schema type, that is, any value held by that variable during execution should be valid XML, according to the specified XML Schema rules. This annotation implies additional constraints on the data. For example, it may specify that an integer has to be in a certain range, or that an XML element has children that satisfy a certain structure. Such XML constraints cannot be specified in a Java type system. One method by which a compiler can verify that uses of variables, expressions and methods satisfy appropriate rules is to hardwire the rules into the compiler. On the other hand, this method is not extensible—if one wanted to add a third type system to the language, with its own set of rules, the compiler must be explicitly modified.

The runtime system for executing applications typically supports only a single type system. During compilation, after the type-checking phase, types in the multiple type systems are typically represented as types in the runtime type system. For example, in XJ, all XML types are reduced to DOM (Document Object Model) classes, such as "Node" and "Element." In effect, the XML types are rewritten into Java types so that the object-code can be executed on any Java Virtual Machine. In this process, the XML type information is lost, unless it is encoded in some form within the object code. Ideally, one would like a generic mechanism by which not only the "real" types are encoded within the object-code, but a reference to the type system as well. This makes the compiler infrastructure less tied to any particular extension; they can be used for a variety of domain-specific languages, each with its own set of type systems. This invention allows a way of extending a language with custom type systems.

There are three components to the method. The first is a mechanism by which, given the name of a type-system, its rules can be loaded into the compiler. One mechanism is for the compiler to provide an application programming interface (API) that the type system provider must implement. For example, in XJ, the XML type system library must implement a "resolveType" method that the compiler can invoke to verify that variables, expressions, and methods are used appropriately with respect to the XML type system.

Second, any specific domain-specific language must provide a type annotator, which is a means of recovering the type system and types from a source program in that domain-specific language. For example, in XJ, if a programmer uses a type "Catalog.Book" in the source program, the type annotator first tries to find a Java type in the classpath of the program. If it cannot find one, it tries to find an XML Schema "Catalog.xsd". If it is able to find such a schema and "Book" refers to the top-level element declaration of the XML element "Book" in "Catalog.xsd", then the type annotator marks variables with that type in the source program with the tuple "(XML, Catalog.Book)". These tuples are signals that allow the compiler to load the type system corresponding to XML and verify that uses of the type are appropriate according to the type system.

The third step in the method is to encode within the object-code of the program with each variable, parameter, field (or any other artifact for which type information is desired) a tuple (TS, T) where TS uniquely identifies the type system and T identifies the type within the type system that is the logical type of the parameter (or variable). The built-in type annotator for the object code uses these tuple annotations to recover the appropriate type information about variables, methods, and so on. Without such information, the compilation process would have lost the precise types, which would preclude correct separate compilation of programs.

Referring now in specific detail to the drawings, and particularly FIG. 1, there is shown a block diagram 100 illustrating a method according to an embodiment of the invention. Source file A 110 is a source program written in the XJ programming language. Source A 110 contains expressions, variables, and methods with types that may be either Java or XML types. The Type Annotator 120 is a mechanism for distinguishing, from the names of the types, whether the type is an XML or Java type. It detects the appropriate types, and classifies the source file 110 by its type and generates a new Source 130, where each use of a type is replaced with a tuple 190 indicating whether the type is an XML or a Java type, and the precise type within the type system.

The Compiler 175 verifies the new Source 130, loading the rules for the appropriate type system using the Type System Loader 140. The Type System Loader 140 may load the rules from a repository, or alternatively, the Type System Loader 140 may access the tuples 190 created by the Type Annotator 120 for the location of the rules. For example, the tuples 190 may point to the location of the rules through a URL (Uniform Resource Locator) address.

The compiler 175 may optionally produce outputA 150, which is the executable or object code version of the source file 110. Typically, the compiler 175 would encode the tuples 190 within the object code so that the Type Annotator 120 for the object code domain-specific language can recover the types appropriately.

Figure 2:
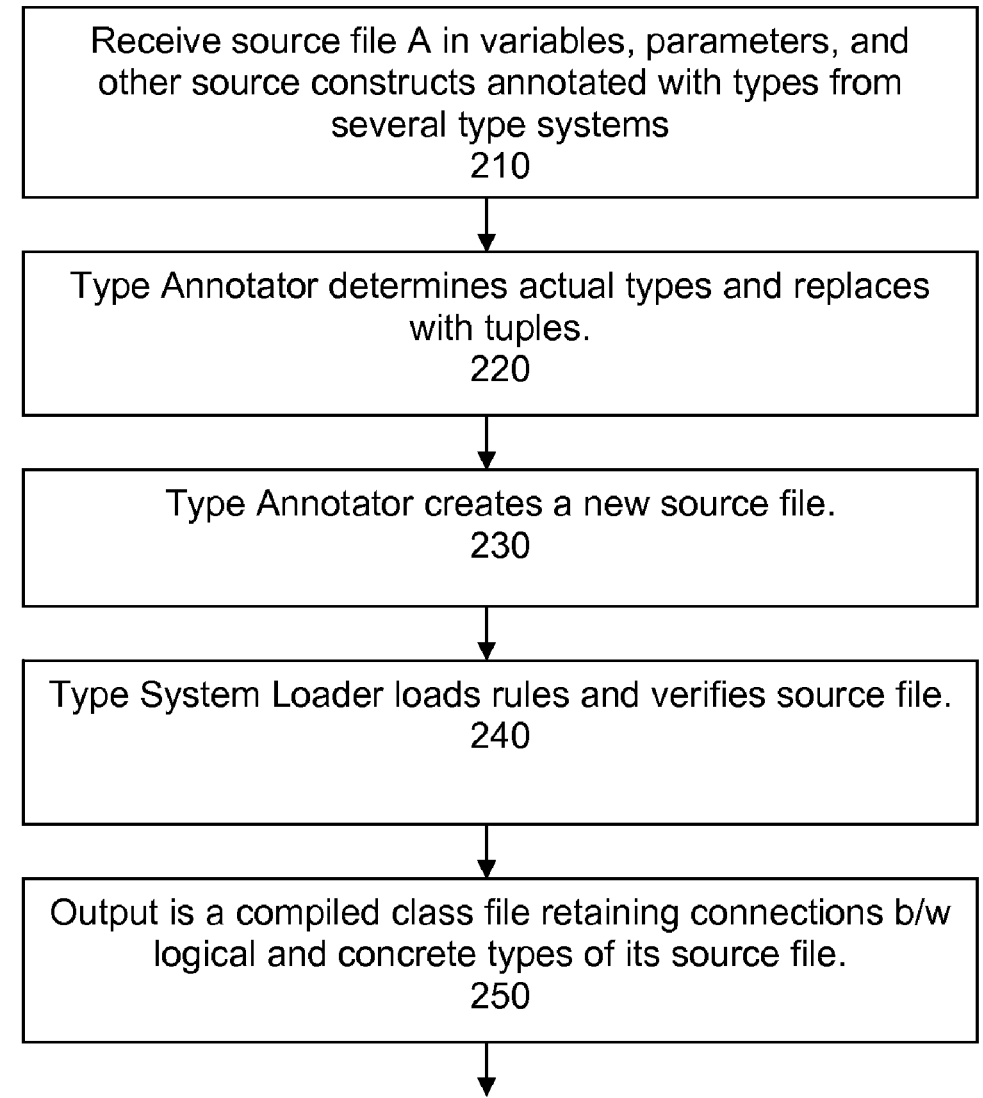
FIG. 2 is a high level block diagram showing an information processing system according to another embodiment of the invention.

Referring to FIG. 2 there is shown a flow chart 200 of a method according to an embodiment of the present invention. In the first step 210, the source file A 110 is received by the Type Annotator 120.

In Step 220 the Type Annotator 120 examines each parameter in the source file 110 and determines the type system to which it belongs. It replaces the types with tuples 190 and in step 230 the Type Annotator 120 creates a new source file 130. In step 240 the new source file 130 is sent to the compiler 175 for compilation. The compiler 175 needs the type system-specific rules for the types, so it uses the Type System Loader 140 to access the rules. In step 250 the compiler 175 produces an output file.

The method proceeds in two phases. The first phase is the source level and the second phase is the class level. In the first level of implementation, a source file is ready for compilation. This file may be a document written in the XJ programming language, containing both Java and XML type information. This file 110 is the input to the process. SourceA 110 is received by the compiler 175.

Source file A 110 is compiled to produce outputA 150 which is a class file. This is the run-time Java phase of the first level. Next, in the Loading and Linking phase of the source level, the compiler 175, rather than hard-wiring the set of rules, plugs in a multi-set of rules 150. Within this first level there are two phases: a run-time Java type phase and a phase of loading and linking, also known as Java Plus.

In the first level the compiler 175 must determine if the output file outputA 150 is correct according to the Java rules by looking up the rules stored in a lookup table. Because the original source file 110 was an XJ file with both Java and XML types, the compiler 175 will need to also retain the XML type information in the output file 150. In current compile methods, this information would be lost.

As part of this compilation process, the compiler 175 needs to determine that the generated file, outputA 150, is correct according to its rules. Because the source file 110 conforms to both Java and XML type rules, the compiler 175 needs to check the rules for both. In order to do this, the compiler 175 references the lookup table containing the sets of rules for multiple file types. According to the first level of this method, we can create a new set of rules which are extensible and can be modified at will.

The second level is the class level. This is the processing that occurs after compilation. In this level the compiler 175 associates, in the output class file 150, with each parameter for which type information is desired, a tuple 190 of type (TS, T), where TS uniquely identifies the type system (for example, XML) and T identifies the type within the type system that is the logical type of the parameter (for example, an XML element). It is essential to record that, for example, an XML string is XML so that this info is retained when it is converted into Java. For every parameter in the class file 150 for which type information is desired (in this example, all XML type parameters), a tuple 190 containing type information and the logical type are inserted into the class file 150.

In one embodiment we associate (in a class file) with each parameter (or any other variable for which type information is desired) a tuple (TS, T) 190 where TS uniquely identifies the type system (Java) and T identifies the type within the type system that is the logical type of the parameter, or variable (XML type). In this example, TS identifies the system as an XML type and T identifies the XML element corresponding to the Java parameter.

The compiled class file is expanded to retain a connection between the logical types and concrete types of its source file 150. This connection information is retained in the tuple 190. This expanded compiled class file is output file 390 with its tuples 190.

After compilation, the tuple 190 can be examined to determine the relationship between the XML type and the Java object. This represents an improvement over the current method of compiling multi-type files wherein one is guaranteed to experience a loss of information when a source file in a programming language that supports multiple type systems is compiled down to a single class file. This information is useful to ensure that other source classes that refer to this class file can be checked for correctness with respect to the logical type and not just the concrete type of the implementation. Level two of this implementation approach guarantees that the information will not be lost by encoding the type information for each selected parameter as tuples 190.

Another advantage of the present invention is that it can be useful for optimizations that take advantage of the logical type information (for example, choosing the representation of a type based on its logical type). In general, in a language with multiple type systems (TS1, TS2, . . . ) that gets compiled down to a class that uses concrete types in a single type system (TS'), one needs to associate with each concrete type, the type system of its logical type and the specific type within the type system.

It may also be useful, at times, to encode the rules of the type system in the class file. When another source file is compiled against this class, a compiler can process the rules of the type system along with the logical type associated with a type and determine whether that source file uses these types appropriately. Rather than encoding the rules themselves, it may be more convenient to encode a pointer to the rules.

Figure 3:
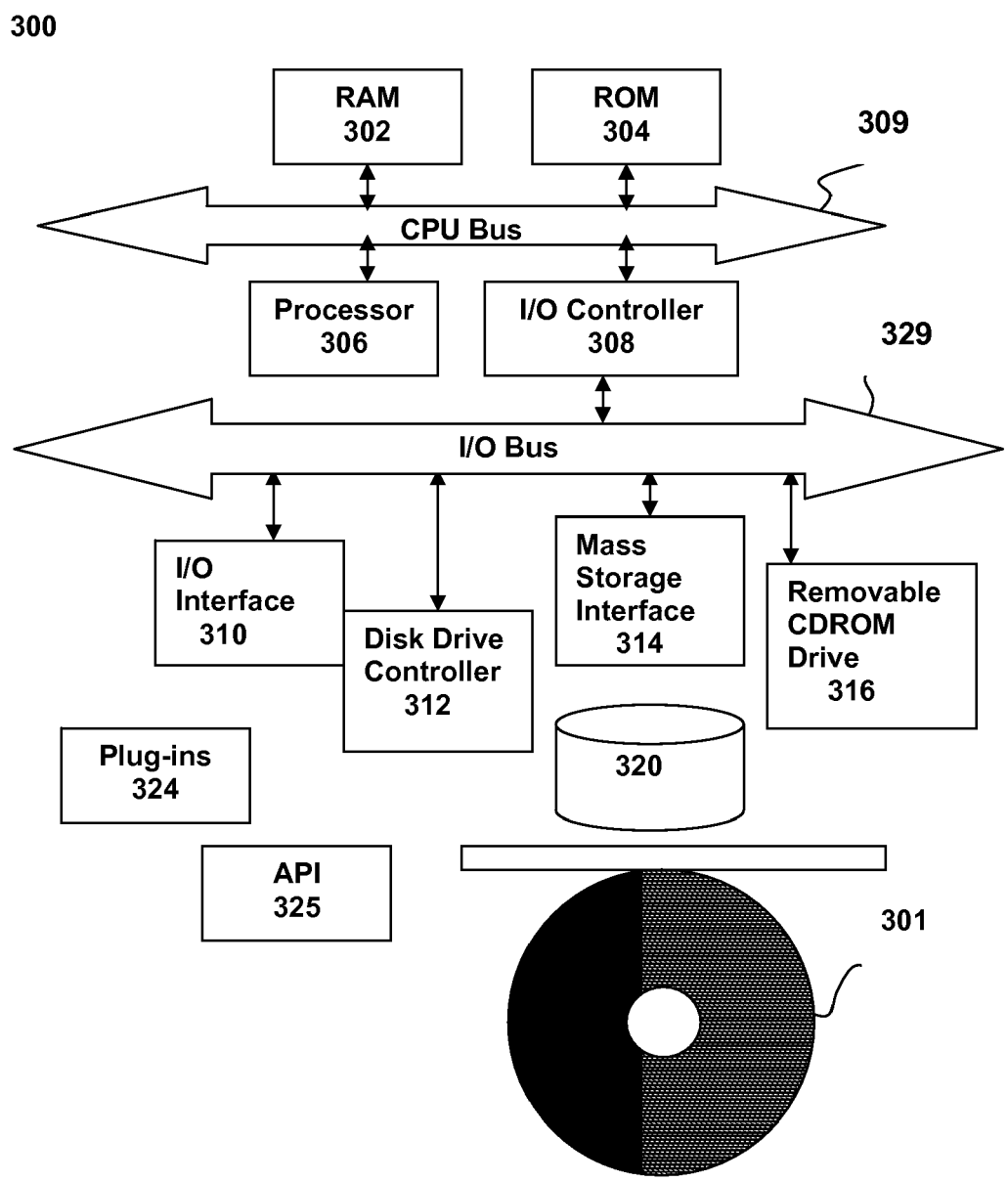
FIG. 3 is a simplified block diagram of an information processing configured according to an embodiment of the present invention.

Referring to FIG. 3 there is shown a block diagram of an information handling system 300 configured to operate according to an embodiment of the present invention. For purposes of this invention, computer system 300 may represent any type of computer, a compiler, information processing system or other programmable electronic device, including a client computer, a server computer, a portable computer, an embedded controller, a personal digital assistant, and so on. The computer system 400 may be a stand-alone device or networked into a larger system.

The system 300 could include a number of operators and peripheral devices, including a processor 302, a memory 304, and an input/output (I/O) subsystem 306. The processor 302 may be a general or special purpose microprocessor operating under control of computer program instructions executed from a memory. The processor 302 may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions.

Alternatively, some or all of the sub-processors may be implemented in an application-specific integrated circuit (ASIC). RAM may be embodied in one or more memory chips. The memory may be partitioned or otherwise mapped to reflect the boundaries of the various memory subcomponents.

The memory 304 represents either a random-access memory or mass storage. It can be volatile or non-volatile. The system 300 can also comprise a magnetic media mass storage device such as a hard disk drive.

The I/O subsystem 306 may comprise various end user interfaces such as a display, a keyboard, and a mouse. The I/O subsystem 306 may further comprise a connection to a network such as a local-area network (LAN) or wide-area network (WAN) such as the Internet. Processor and memory components may be physically interconnected using conventional bus architecture; or on-chip memory (no bus) may be used.

Application plug-ins 324 and APIs 325 can be made part of the information processing system 300. The type annotator 120 and type system loader 140 can be separate physical components of the information processing system 300 or they can be logical constructs of the processor 306. The type annotator 120 and the type system loader 140 may be APIs and/or plug-ins.

According to an embodiment of the invention, a computer readable medium, such as a CDROM 301, can include program instructions for operating the programmable computer 300 according to the invention. The processing apparatus of the programmable computer 300 comprises: random access memory 302, read-only memory 304, a processor 306 and input/output controller 308. These are linked by a CPU bus 309. Additionally, there is an input/output bus 329, and input/output interface 310, a disk drive controller 312, a mass storage device 320, a mass storage interface 314, and a removable CDROM drive 316.

What has been shown and discussed is a highly-simplified depiction of a programmable computer apparatus 300. Those skilled in the art will appreciate that a variety of alternatives are possible for the individual elements, and their arrangement, described above, while still falling within the scope of the invention. Thus, while it is important to note that the present invention has been described in the context of a fully functioning compiler, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of signal bearing media include ROMs, DVD-ROMs, and transmission-type media, such as digital and analog communication links, wired or wireless communications links using transmission forms, such as, for example, radio frequency and light wave transmissions. The signal bearing media make take the form of coded formats that are decoded for use in a particular data processing system.

Therefore, while there has been described what is presently considered to be the preferred embodiment, it will understood by those skilled in the art that other modifications can be made within the spirit of the invention.

The invention claimed is:

1. A method for extending functionality of a compiler, the method comprising:
   using a processor device configured to perform:
      receiving a first source file written in a language that supports multiple type systems, wherein the first source file comprises a plurality of source constructs associated with parameter types from the multiple type systems;
      creating a tuple in the first source file;
      annotating each of the plurality of source constructs with the tuple, the tuple comprising:
         a type system from one of the multiple type systems;
         a precise parameter type to which its associated type system belongs; and
         an encoded parameter associated with type system rules;
      retrieving the type system rules from a type system loader, the type system rules corresponding to each type system referred to in the first source file;
      verifying, using the type system rules, that instances of use of variables, expressions, and methods in the first source file are appropriate with respect to the type system of annotated types associated with the plurality of source constructs for extending functionality of the compiler; and
      compiling the first source file to produce a second source file comprising type information retained from the first source file.

2. The method of claim 1 wherein annotating further comprises encoding a pointer to the type system rules.

3. The method of claim 1 wherein retrieving further comprises loading the type system rules from an external repository.

4. The method of claim 1 wherein annotating further comprises encoding the type system rules in the first source file.

5. The method of claim 1 further comprising processing other source files in order to annotate them.

6. The method of claim 1 further comprising implementing an application programming interface to verify that the variables, expressions, and methods are used appropriately with respect to the type system.

7. The method of claim 1 wherein annotating with the encoded parameter further comprises encoding the type system rules in each tuple.

8. The method of claim 1 further comprising plugging in a multi-set of rules into each tuple.

9. The method of claim 1 wherein annotating with the encoded parameter further comprises inserting a pointer to the type system rules in the tuple.

10. The method of claim 1 further comprising verifying in the second source file that the instances of the use of the variables, expressions, and methods are appropriate with respect to the type system.

11. An information processing system comprising:
a processor device configured for executing a first source file written in a language that supports multiple type systems, wherein the first source file comprises a plurality of source constructs associated with parameter types of the multiple type systems;
an input/output interface configured for receiving the first source file; and
a compiler operatively coupled with the input/output interface, the compiler configured for:
creating a tuple in the first source file;
retrieving type system rules corresponding to each type system referred to in the first source file from a type system loader;
annotating each of the plurality of source constructs with the tuple, the tuple comprising:
a type system from one of the multiple type systems;
a precise parameter type to which its associated type system belongs; and
an encoded parameter associated with the type system rules;
verifying, using the type system rules, that instances of use of variables, expressions, and methods in the first source file are appropriate with respect to the type system of annotated types associated with the plurality of source constructs for extending functionality of the compiler; and
compiling the first source file to produce a second source file comprising type information retained from the first source file.

12. The information processing system of claim 11 wherein the compiler is further configured to insert a pointer to the type system rules in the tuple.

13. An information processing system comprising:
a processor device configured for executing a first source file written in a language that supports multiple type systems, wherein the first source file comprises a plurality of source constructs associated with parameter types of the multiple type systems;
an input/output interface configured for receiving the first source file;
a type system loader configured for:
creating a tuple in the first source file; and
providing type system rules corresponding to each type system referred to in the first source file;
a type annotator configured for:
examining each of the plurality of source constructs in the first source file and determining its type system; and
annotating each of the plurality of source constructs with the tuple, the tuple comprising:
a type system from one of the multiple type systems;
a precise parameter type to which its associated type system belongs; and
an encoded parameter associated with the type system rules;
an application programming interface configured for verifying, using the type system rules, that instances of use of variables, expressions, and methods in the first source file are appropriate with respect to the type system of annotated types associated with the plurality of source constructs for extending functionality of a compiler; and
a compiler configured for compiling the first source file to produce a second source file comprising type information retained from the first source file.

14. The information processing system of claim 13 wherein the type annotator is a logical component of the compiler.

15. The information processing system of claim 13 wherein the type system loader is a logical component of the compiler.

16. A computer program product tangibly embodied on a non-transitory computer readable medium and comprising code that, when executed, causes a computer to perform the following:
using a processor device to:
receive a first source file written in a language that supports multiple type systems, wherein the first source file comprises a plurality of source constructs associated with parameter types of the multiple type systems;
create a tuple in the first source file;
retrieve type system rules corresponding to each type system referred to in the first source file from a type system loader;
annotate each of the plurality of source constructs with the tuple, the tuple comprising:
a type system from one of the multiple type systems;
a precise parameter type to which its associated type system belongs; and
an encoded parameter associated with the type system rules;
verify, using the type system rules, that instances of use of variables, expressions, and methods in the first source file are appropriate with respect to the type system of annotated types associated with the plurality of source constructs for extending functionality of a compiler; and
compile the first source file to produce a second source file comprising type information retained from the first source file.

* * * * *